United States Patent [19]

Takabe et al.

[11] Patent Number: 5,655,782
[45] Date of Patent: Aug. 12, 1997

[54] SEAL DEVICE FOR LYSHOLM COMPRESSOR

[75] Inventors: Shigeru Takabe, Sagamihara; Nobuo Takei, Urayasu; Takashi Kobayashi, Mitaka, all of Japan

[73] Assignee: Ishikawajima-Harima Jukogyo Kabushiki Kaisha, Tokyo-to, Japan

[21] Appl. No.: 635,486

[22] Filed: Apr. 22, 1996

[51] Int. Cl.$^6$ .................................. F16J 9/26; F01C 1/16
[52] U.S. Cl. .................. 277/96.1; 277/96.2; 277/181; 418/201.1
[58] Field of Search .................. 277/96.1, 96.2, 277/181; 418/201.1

[56] References Cited

U.S. PATENT DOCUMENTS

| | | | |
|---|---|---|---|
| 2,174,522 | 10/1939 | Lysholm | 230/143 |
| 3,877,442 | 4/1975 | Miller, Jr. | 123/8.45 |
| 4,846,642 | 7/1989 | Nuber et al. | 418/201.1 |
| 4,973,068 | 11/1990 | Lebeck | 277/96.1 |

FOREIGN PATENT DOCUMENTS 3 89203   9/1991   Japan.
7 49044   11/1995   Japan.

OTHER PUBLICATIONS

Patent Abstracts of Japan, vol. 14, No. 583, Dec. 26, 1990, JP-A-02 253064, Oct. 11, 1990.
Patent Abstracts of Japan, vol. 10, No. 161, Jun. 10, 1986, JP-A-61 014278, Jan. 22, 1986.

*Primary Examiner*—William A. Cuchlinski, Jr.
*Assistant Examiner*—Christina Annick
*Attorney, Agent, or Firm*—Oblon, Spivak, McClelland, Maier & Neustadt, P.C.

[57] ABSTRACT

A seal device for a Lysholm compressor has a carbon seal ring and a metal maintaining ring arranged peripherally of a shaft of a male or female rotor, the seal ring being pressed against the maintaining ring to achieve sealing. Square root of a sum of square of surface roughness of the seal ring and square of surface roughness of the maintaining ring is in the range of 0.8 to 2.5 Z, which prevents occurrence of blisters on a surface of the seal ring and leaked oil amount can be within the leakage permissible level.

3 Claims, 10 Drawing Sheets

FIG. 1

PRIOR ART

PRIOR ART

FIG. 4

PRIOR ART

FIG. 5

PRIOR ART

FIG. 6

PRIOR ART

FIG. 7

PRIOR ART

SEAL DEVICE FOR LYSHOLM COMPRESSOR

BACKGROUND OF THE INVENTION

The present invention relates to a seal device for a Lysholm compressor to be used for sealing a rotor shaft of the compressor.

Figure 1:
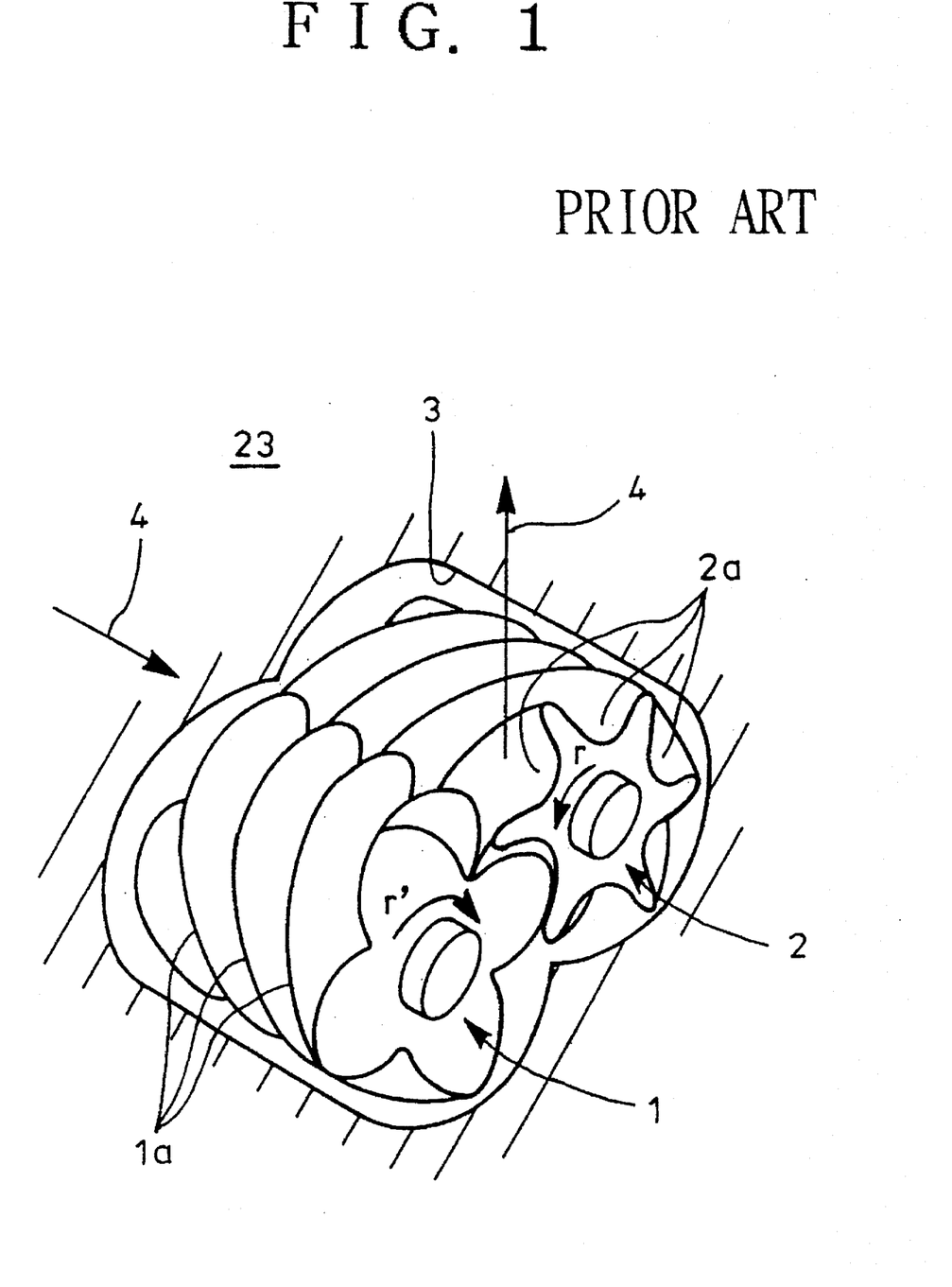
FIG. 1 is a schematic perspective view of a Lysholm compressor.
Figure 2:
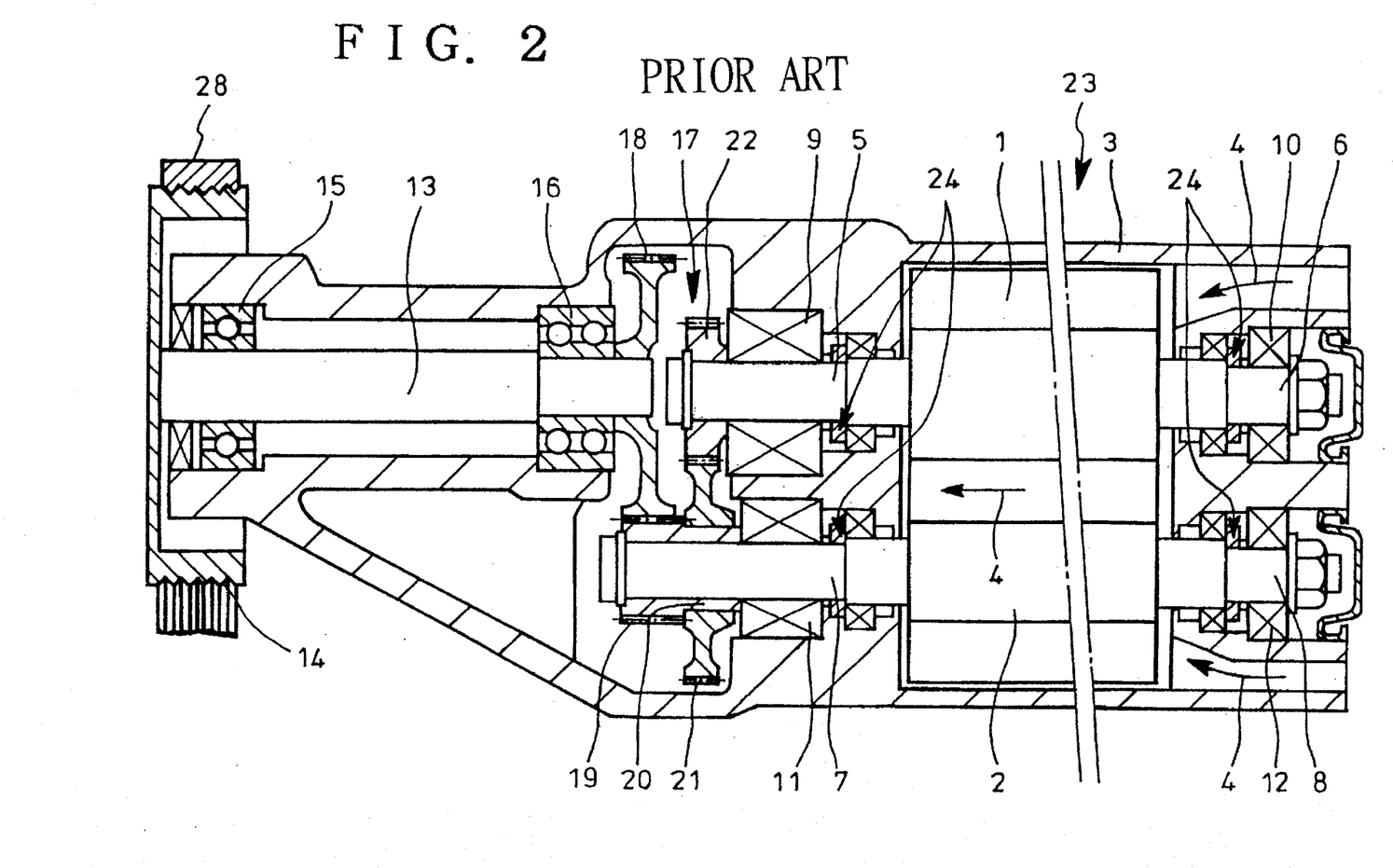
FIG. 2 is a cross-sectional view of the compressor.

FIGS. 1 and 2 schematically illustrate a Lysholm compressor 23 which comprises a male rotor 1 with helical crests 1a on its periphery and a female rotor 2 with helical valleys 2a on its periphery for meshing with the crests 1a of the rotor 1. The rotors 1 and 2 mesh with each other and are rotatably accommodated in a casing 3. The rotors 1 and 2 are rotated in directions of arrows r and r', respectively, in FIG. 1 to suck the air 4 from an axial end of the compressor. The air 4 is then compressed between the rotors 1 and 2 and is discharged from the other axial end of the compressor in a direction perpendicular to the axis. As shown in FIG. 2, the rotors 1 and 2 are supported at their respective shafts 5, 6 and 7, 8 protruding from opposite axial ends of the rotors 1 and 2, by the casing 3 through bearings 9, 10 and 11, 12, respectively.

An input shaft 13 is arranged in the casing 3 on a side opposite to the air suction side, i.e. at the left in FIG. 2, and a pulley 14 for the compressor is arranged on an outer end of the input shaft 13.

The input shaft 13 is rotatably supported at its outer end on the pulley 14 by a bearing 15 and at its inner end in the casing 3 by a bearing 16.

Interposed between the inner end of the input shaft 13 and the shafts 5 and 7 is a speed increasing device 17 which comprises a speed increasing gear 18 fixed to the inner end of the input shaft 13, a speed increasing pinion 19 fixed to the shaft 7 of the rotor 2 and meshing with the gear 18, a female-rotor timing gear 21 fixed to a boss 20 of the pinion 19 and a male-rotor timing gear 22 fixed to the shaft 5 of the rotor 1 and meshing with the gear 21, Lubricant is filled in the speed increasing device 17 and in a space at the right in FIG. 2 surrounding the shafts 6 and 8. In order to prevent leakage of the lubricant toward the rotors 1 and 2, seal devices 24 are provided respectively between the rotor 1 and the bearings 9 and 10 of the shafts 5 and 6 and between the rotor 2 and the bearings 11 and 12 of the shafts 7 and 8.

Figure 3:
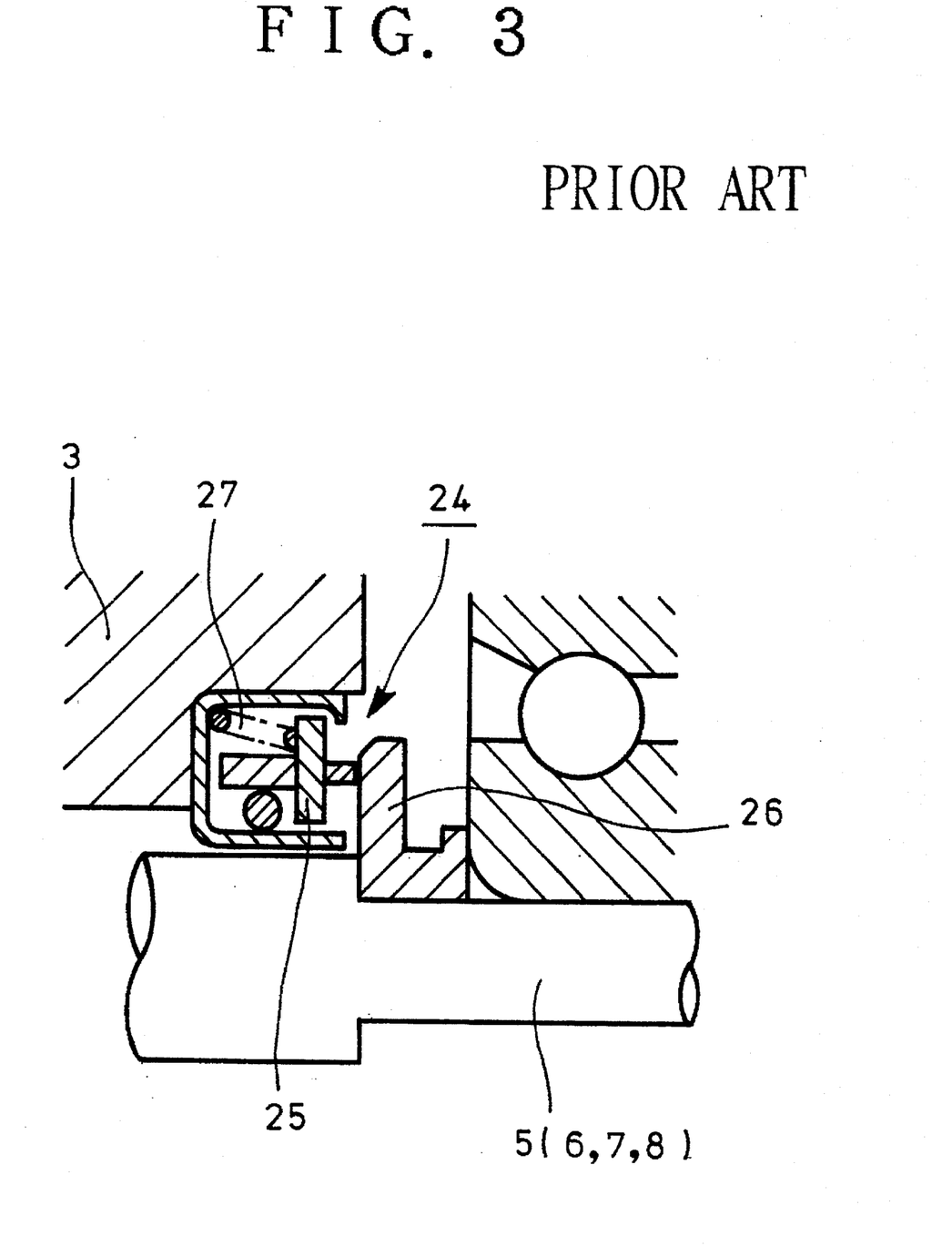
FIG. 3 is an enlarged cross-sectional view of a seal device for the compressor.

As shown in FIG. 3, which is an enlarged cross-sectional view, the seal device 24 comprises a seal ring 25 and a maintaining ring 26 arranged peripherally of the shaft 5, 6, 7 or 8. The seal ring 25 is non-rotatably supported in the casing 3 and the maintaining ring 26 is rotatably supported on the shaft 5, 6, 7 or 8. The seal ring 25 is pressed against the maintaining ring 26 by a spring 27 to attain complete sealing at contact surface between the rings 25 and 26, thereby preventing oil leakage.

The seal ring 25 is made of sintered carbon. The pressing surface of the seal ring 25 is polished to have fine surface roughness of less than about 0.8μ and is pressed against the maintaining ring 26 which is made of metal and which is polished to similar degree of surface roughness, thereby assuring full sealing between the rings 25 and 26. Here, the surface roughness is based on the height profile irregularities at ten points, $R_z$, (see ISO 468-1982), μ representing a micron.

The pulley 14 shown in FIG. 2 is coupled to an output shaft of an engine via a belt 28 so as to transmit rotation of the output shaft of the engine to the input shaft 13.

Figure 4:
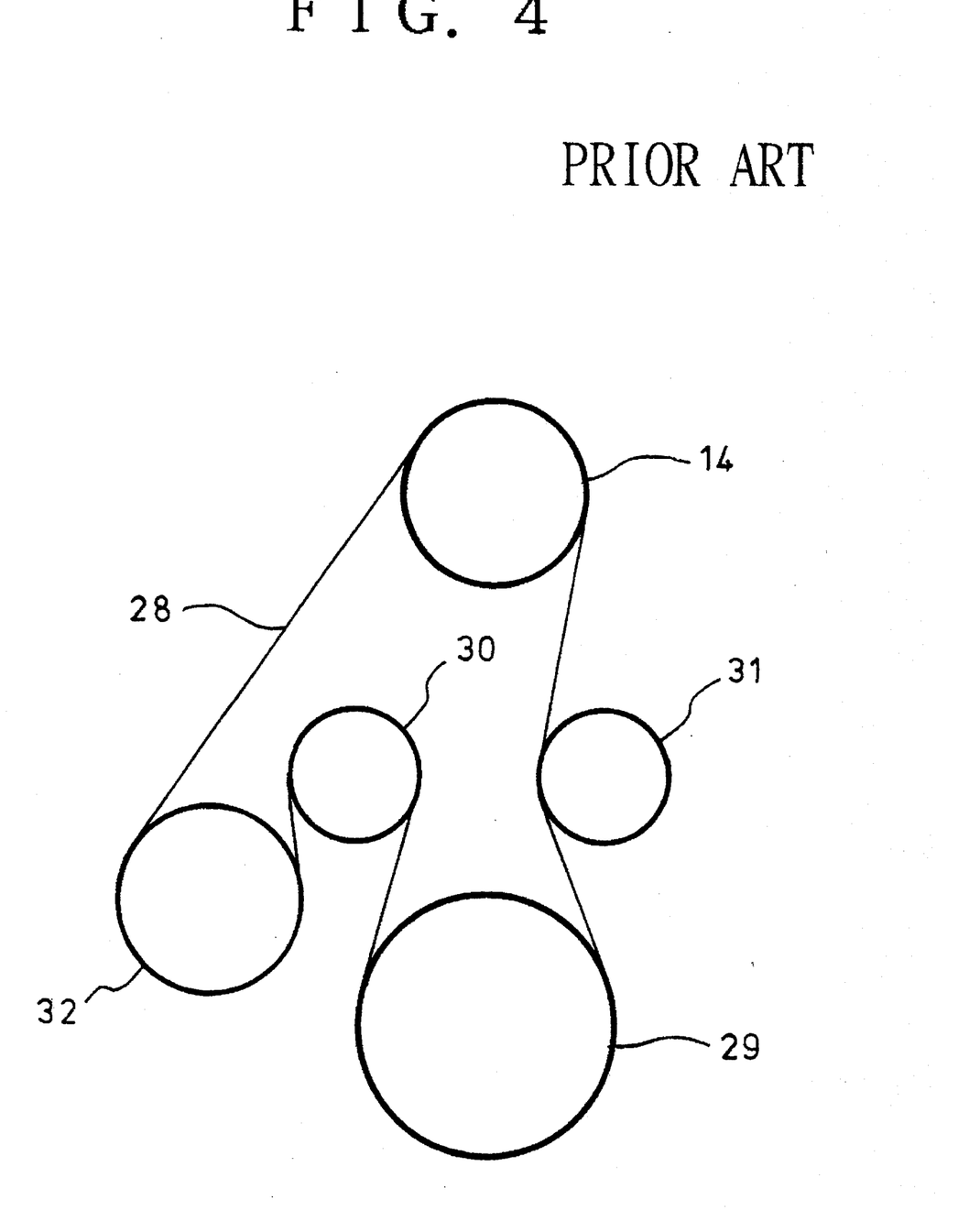
FIG. 4 is a front view showing a belt transmission system.

As shown in FIG. 4, the belt 28 is connected on a crank pulley 29 fixed to the output shaft of the engine, and tension is applied to the belt 28 by a tensioner 30. Rotation of the output shaft of the engine is transmitted to the pulley 14 as well as further pulleys 31 and 32 provided for other auxiliaries or accessories.

Figure 5:
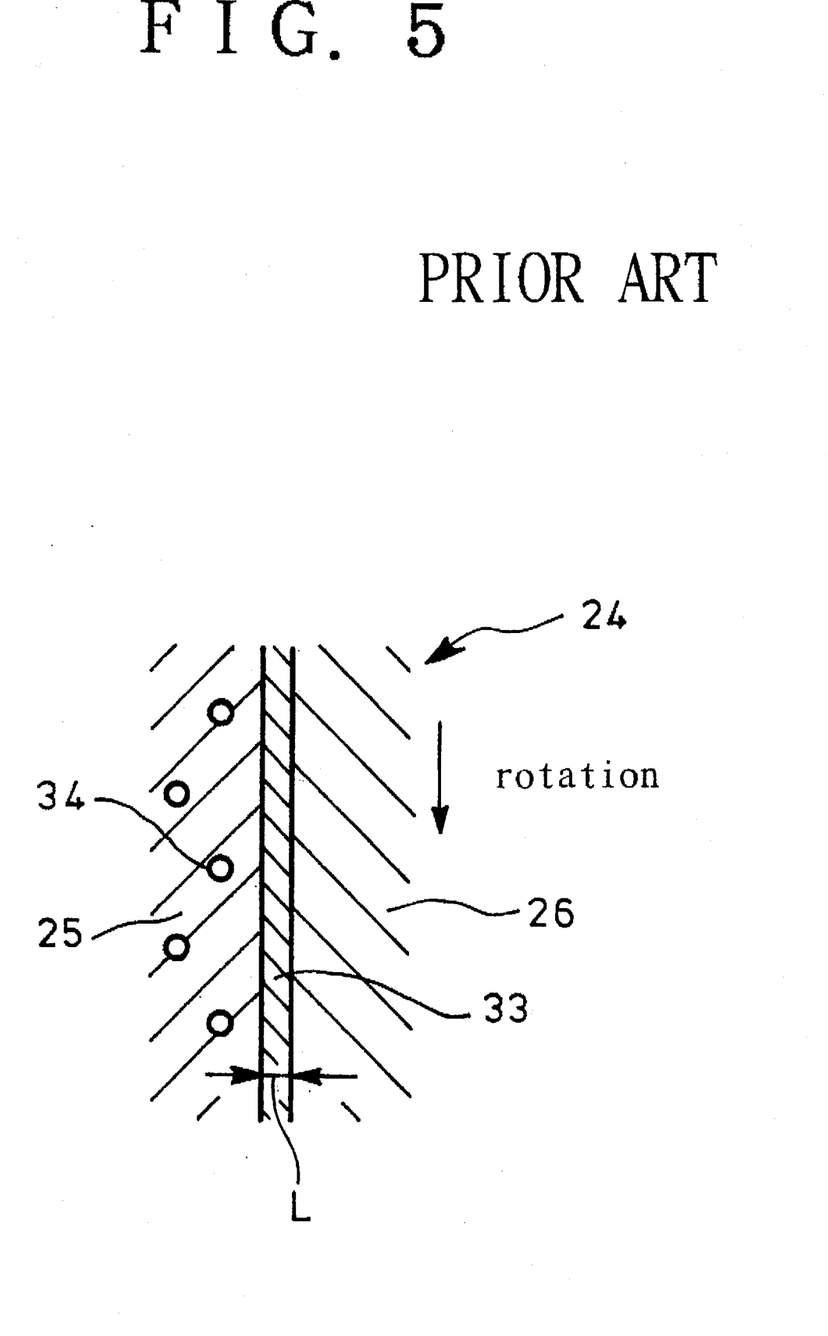
FIG. 5 is an enlarged cross-sectional view showing contact condition of a seal ring with a maintaining ring.

When the seal ring 25 in FIG. 3 is kept to have smooth surface with surface roughness of less than about 0.8μ, an oil film 33 is formed as shown in FIG. 5 between the non-rotating seal ring 25 and the rotating maintaining ring 26. This oil film 33 provides a minute gap L of about 5μ between the surfaces of the rings 25 and 26, thereby excluding oil leakage.

As already explained in connection with FIG. 4, the crank pulley 29 is rotated by the output shaft of the engine. The rotating speed of the engine will suddenly change. When the rotating speed of the maintaining ring 26 is suddenly increased via the belt 28, input shaft 13 and speed increasing device 17 in FIG. 2, high shearing force is suddenly applied on the finely polished or mirror-finished surface of the seal ring 25 by the oil film 33 shown in FIG. 5. Then, pores 34 present within the carbon seal ring 25 may cause cracking and cracks may be propagated.

Figure 6:
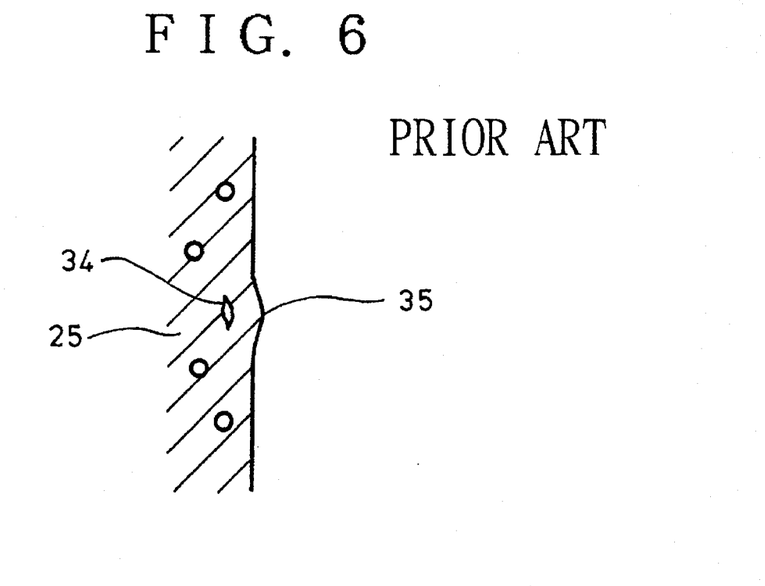
FIG. 6 is an enlarged cross-sectional view of the seal ring where blister has occurred.

As a result, a swelling known as blister 35 may occur on the surface of the seal ring 25 as shown in FIG. 6.

Figure 7:
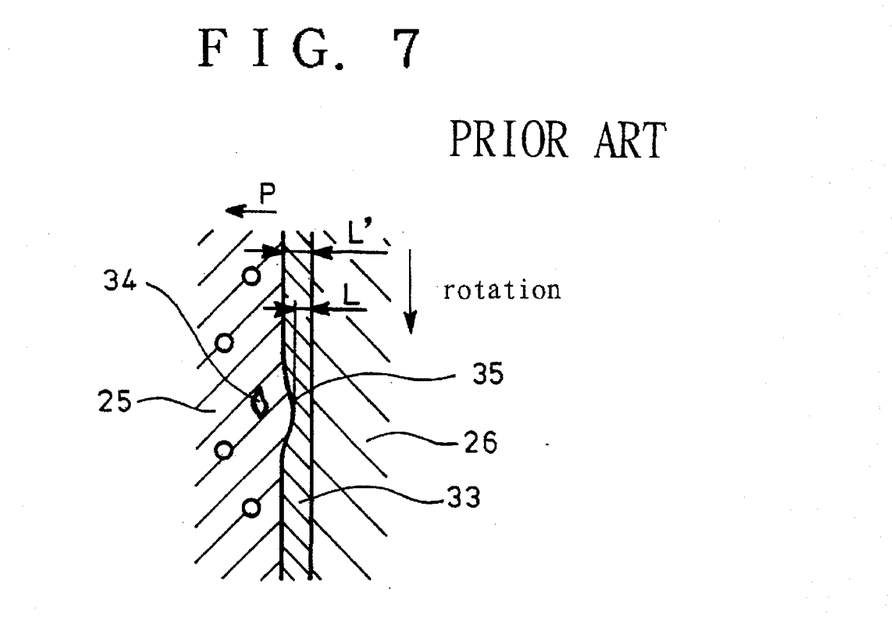
FIG. 7 is an enlarged cross-sectional view showing contact condition of the seal ring with blister occurred on it with the maintaining ring.

When the blister 35 is formed on the surface of the seal ring 25, the ring 25 is pressed by bounce of the oil film 33 in a direction away from the maintaining ring 26 as shown by an arrow P in FIG. 7. As a result, distance L' between the surfaces of the rings 25 and 26 is widened such that the distance L from the top of the blister 35 to the surface of the maintaining ring 26 is about 5μ. This will lead to oil leakage and deterioration of seal effect.

It is therefore an object of the present invention to provide a seal device for a Lysholm compressor which prevents the occurrence of blister to enhance seal effect.

SUMMARY OF THE INVENTION

In a seal device for a Lysholm compressor comprising a carbon seal ring and a metal maintaining ring peripherally of a shaft of a male or female rotor, the seal ring being pressed against the maintaining ring to achieve sealing, the present invention is directed to improvement wherein square root of a sum of square of surface roughness of the seal ring and square of surface roughness of the maintaining ring is in the range of 0.8 to 2.5μ.

With said square root being in the range of 0.8 to 2.5μ, no blister occurs on the surface of the seal ring and any possible oil leakage is within permissible range.

An embodiment of the present invention will be described in conjunction with the drawings.

DETAILED DESCRIPTION OF THE PREFERRED EMBODIMENT

Similarly to the seal device 24 shown in FIGS. 2, 3 and 5, the seal device of the present invention comprises a carbon seal ring 25 and a metal maintaining ring 26 arranged peripherally of a shaft 5, 6, 7 or 8. The seal ring 25 is non-rotatably supported in the casing 3 and the maintaining ring 26 is rotatably supported by the shaft 5, 6, 7 or 8. The seal ring 25 is pressed against the maintaining ring 26 by a spring 27, and oil film is formed by the seal ring 25 and the maintaining ring 26 to achieve sealing and to prevent oil leakage. The seal ring 25 is made of sintered carbon.

Conventionally, the seal ring 25 and the maintaining ring 26 are polished thoroughly to attain fine surface roughness of less than about 0.8μ while, in the present invention, square root of a sum of square of surface roughness of the seal ring 25 and square of surface roughness of the maintaining ring 26 is in the range of 0.8 to 2.5μ.

More specifically, provided that surface roughness of the seal ring 25 is $R_{S/R}$ and surface roughness of the maintaining ring 26 is $R_{M/R}$, representative roughness R is given in the following equation (1). Results of tests where representative roughness R is varied to ascertain its effect on the occurrence of blister and oil leakage, are shown in FIG. 8.

$$R = \sqrt{(R_{S/R})^2 + (R_{M/R})^2} \qquad (1)$$

Figure 8:
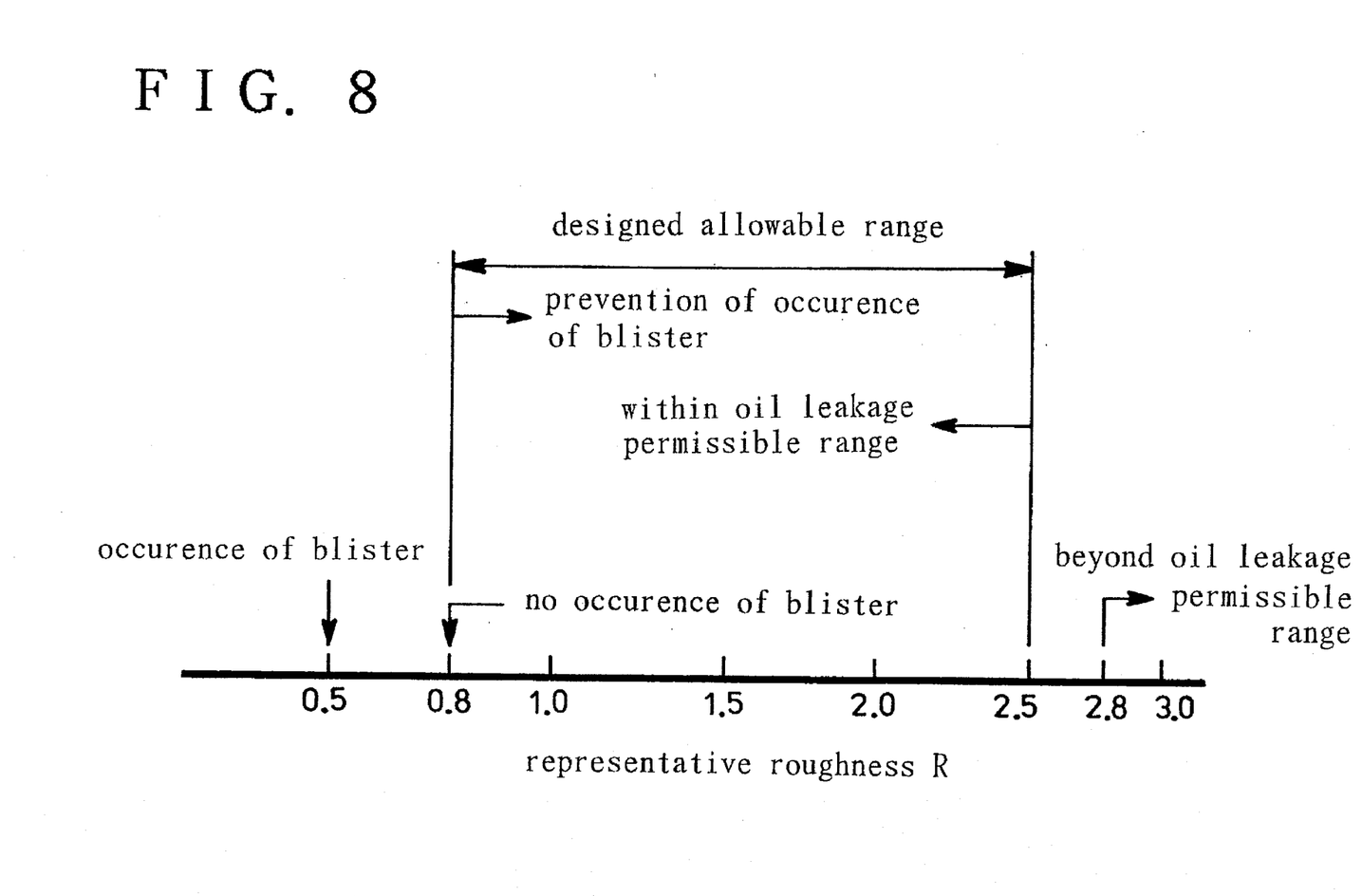
FIG. 8 is a diagram serving as a basis of the present invention, showing the results of tests on the relationship between representative roughness of the seal and maintaining rings and occurrence of blister and oil leakage.

In the tests shown in FIG. 8, ordinary engine oil of 10W-20 to 10W-40 was used as oil. A plurality of tests were performed at normal temperature (20° C.) and at −35° C., assuming severe condition.

In the case where representative roughness R was set to 0.5μ, occurrence of blister was noted; with the representative roughness being set to 0.8μ or more, no blister occurred. Therefore, according to the present invention, representative roughness R is set to 0.8μ or more to prevent occurrence of blister.

In the case where representative roughness R was set to 2.8μ or more, the permissible level for oil leakage in consideration of practical use conditions in the market was exceeded. In the case where representative roughness was set to 2.5μ or less, oil leakage can be reduced within the permissible level. Accordingly, in the present invention, representative roughness R is set to 2.5μ or less to have oil leakage in the permissible range.

Figure 9:
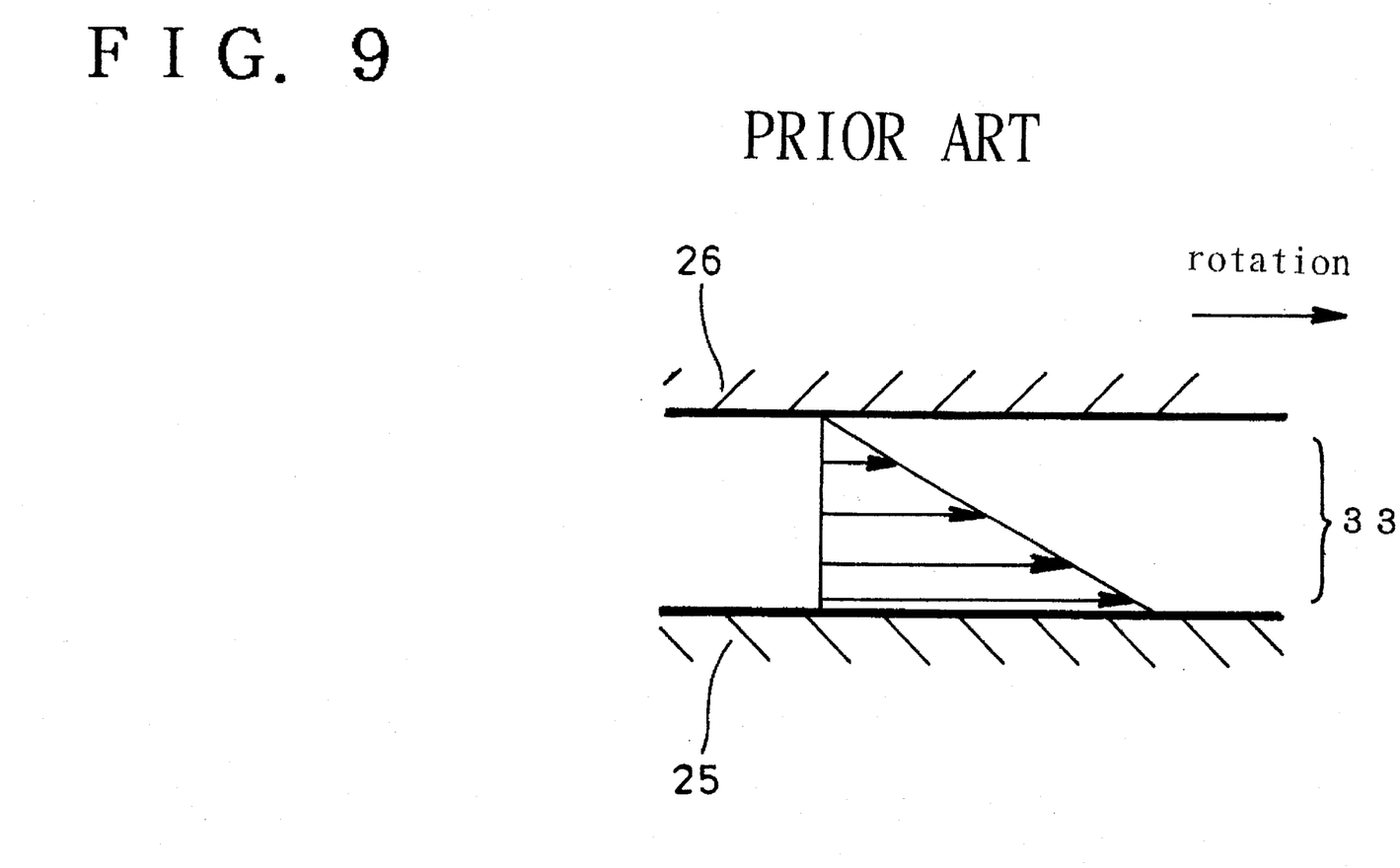
FIG. 9 is an enlarged cross-sectional view showing shearing force on a mirror-finished surface where representative roughness of conventional seal and maintaining rings is low.

When the representative roughness R of the seal ring 25 (stationary side) and maintaining ring 26 (rotating side) is set to less than about 0.8μ, as in the case of the prior art, by polishing them to have mirror-finished surfaces, it is evident from shear distribution shown by arrows in FIG. 9 that shearing force reaches maximum on the surface of the seal ring 25 on the stationary side if the rotation speed of the maintaining ring 26 on the rotating side is suddenly increased. This shearing force may cause pressure concentration on minute pores in the seal ring 25, resulting in local destruction which is propagated to generate blisters, thereby swelling the surface.

Figure 10:
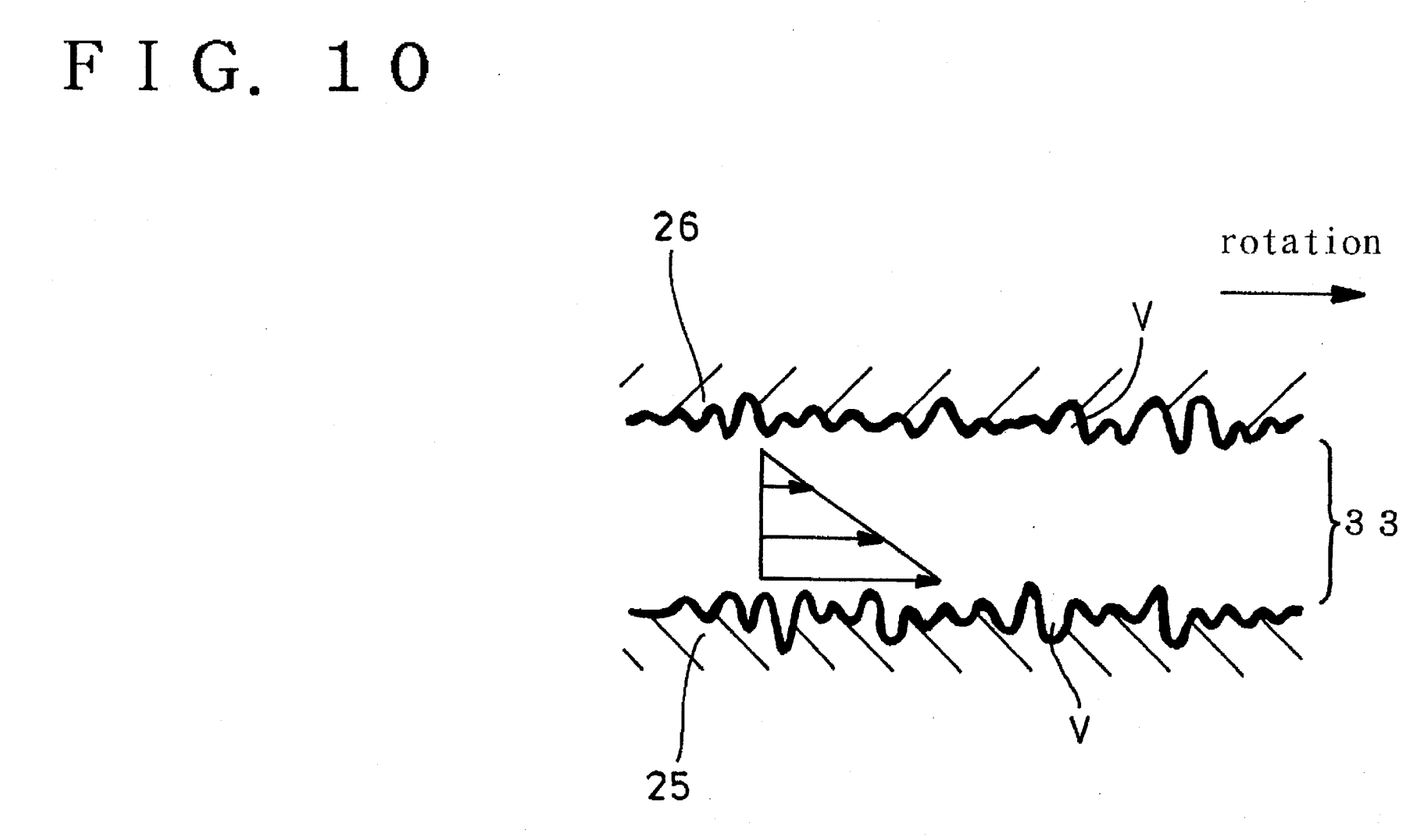
FIG. 10 is an enlarged cross-sectional view showing shearing force in the case of representative roughness being high.

By contrast, when representative roughness of the seal ring 25 and maintaining ring 26 is set to 0.8μ or more, shearing force due to oil is lower than that in the case of the mirror-finished rings shown in FIG. 9 since thickness of the oil film 33 becomes discontinuous as shown in FIG. 10 and oil is trapped in V-shaped valleys V on the surfaces, thereby suppressing occurrence of blisters.

Figure 11:
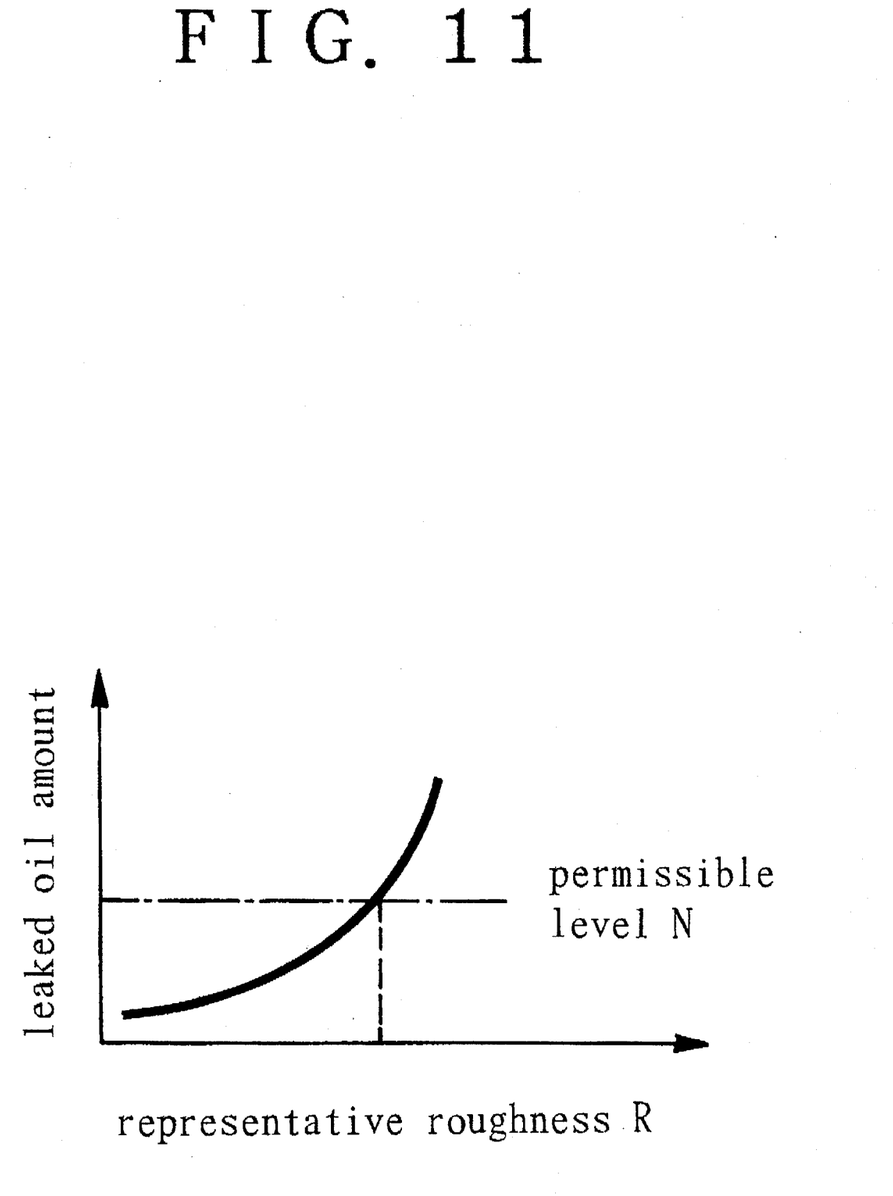
FIG. 11 is a graph showing the relationship between the representative roughness and leaked oil amount.

However, when representative roughness R is set too high, the oil film 33 becomes too thick in some portions where the seal ring 25 and the maintaining ring 26 are separated too wide from each other, which may lead to oil leakage exceeding the permissible range. FIG. 11 shows the relationship between representative roughness R of the seal ring 25 and maintaining ring 26 and the leaked oil amount. It is evident from this diagram that oil leakage suddenly increases when representative roughness R is high.

In this respect, as mentioned above, oil leakage can be suppressed within the permissible level N by setting the representative roughness R to 2.5μ or less. With the representative roughness R being set to 2.5μ or less, property of exhaust gases can be managed to be within the limit of emission regulation for automobiles or the like even when the oil leaking to the rotors may invade into the engine.

As described above, representative roughness R set to the designed allowable range of 0.8 to 2.5μ eliminates the problem of blisters occurring on the surface of the seal ring often encountered in the prior art even when rotating speed of the maintaining ring is suddenly changed. As a result, the distance between the seal ring surface and the maintaining ring surface is not widened; leaked oil amount is reduced within the leakage permissible level; and satisfactory seal effect can be assured.

What is claimed is:

1. In a seal device for a Lysholm compressor having a carbon seal ring and a metal maintaining ring arranged peripherally of a shaft of a male or female rotor, the seal ring being pressed against the maintaining ring to achieve sealing, the improvement wherein a representative roughness, which is square root of a sum of square values of surface roughness values of pressing surfaces of the seal ring and maintaining ring, is in the range of 0.8 to 2.5μ.

2. A rotary machine comprising:

a male rotor mounted on a first shaft;

a female rotor mounted on a second shaft;

at least one carbon seal ring arranged peripherally of at least one of the first or second shafts;

at least one metal maintaining ring arranged peripherally of each of said at least one first and second shafts, each said at least one metal maintaining ring pressed against a respective carbon seal ring, thereby defining respective carbon seal ring and metal maintaining ring pressing surfaces, to achieve sealing;

each of the respective carbon seal ring and metal maintaining ring pressing surfaces having a representative roughness, defined as a square root of a sum of square values of surface roughness values of pressing surfaces of the carbon seal ring and metal maintaining ring, in the range of 0.8 to 2.5μ.

3. A rotary machine as recited in claim 2, wherein the rotary machine comprises a Lysholm compressor.

* * * * *